United States Patent
Krall et al.

(10) Patent No.: US 11,773,285 B2
(45) Date of Patent: Oct. 3, 2023

(54) SEALERS, METHODS OF PRODUCING SEALERS, AND METHODS OF SEALING CONSTRUCTION PRODUCTS

(71) Applicant: AXALTA COATING SYSTEMS IP CO., LLC, Wilmington, DE (US)

(72) Inventors: Eric Krall, Minneapolis, MN (US); James Bailey, Trinity, NC (US); Fong Vang, Columbus, MN (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 150 days.

(21) Appl. No.: 17/184,230

(22) Filed: Feb. 24, 2021

(65) Prior Publication Data

US 2021/0261812 A1    Aug. 26, 2021

Related U.S. Application Data

(60) Provisional application No. 62/981,156, filed on Feb. 25, 2020.

(51) Int. Cl.
| | |
|---|---|
| *C09D 163/04* | (2006.01) |
| *C09D 7/61* | (2018.01) |
| *C09D 5/00* | (2006.01) |
| *C08G 59/50* | (2006.01) |
| *C08G 59/38* | (2006.01) |

(52) U.S. Cl.
CPC .......... *C09D 163/04* (2013.01); *C08G 59/38* (2013.01); *C08G 59/50* (2013.01); *C09D 5/00* (2013.01); *C09D 7/61* (2018.01)

(58) Field of Classification Search
CPC ...... C09D 163/04; C08G 59/38; C08G 59/50; C04B 26/14
See application file for complete search history.

(56) References Cited

U.S. PATENT DOCUMENTS

| | | |
|---|---|---|
| 7,524,555 B2 | 4/2009 | Peng et al. |
| 7,758,954 B2 | 7/2010 | Nguyen et al. |
| 7,985,821 B2 | 3/2011 | Lejeune et al. |
| 8,297,018 B2 | 10/2012 | Peng et al. |
| 8,415,009 B2 | 4/2013 | Peng et al. |
| 8,501,863 B2 | 8/2013 | Lazarus et al. |
| 8,728,345 B2 | 5/2014 | Iyer et al. |
| 9,267,052 B1 | 2/2016 | Joecken et al. |
| 9,404,014 B2 | 8/2016 | Heine et al. |
| 9,920,216 B2 | 3/2018 | Thorlaksen et al. |
| 10,364,196 B2 | 7/2019 | Chen et al. |
| 2003/0129348 A1 | 7/2003 | Peng |
| 2004/0087684 A1 | 5/2004 | Hoefer et al. |
| 2005/0208285 A1 | 9/2005 | Lyons et al. |
| 2006/0024480 A1 | 2/2006 | Lyons et al. |
| 2006/0182946 A1 | 8/2006 | Zarb et al. |
| 2013/0000839 A1* | 1/2013 | Grun ........................ C08L 63/00 525/485 |
| 2017/0073543 A1 | 3/2017 | Joecken et al. |
| 2018/0037514 A1 | 2/2018 | Chowdhury et al. |
| 2019/0292786 A1 | 9/2019 | Joecken et al. |

FOREIGN PATENT DOCUMENTS

| | | | | |
|---|---|---|---|---|
| AU | 745114 B2 | 3/2002 | | |
| CN | 1668458 A | 9/2005 | | |
| DE | 102015109125 A1 * | 1/2016 | ............. | C04B 12/04 |
| EP | 1322716 A1 | 7/2003 | | |
| EP | 1322717 B1 | 1/2005 | | |
| EP | 2826797 A1 * | 1/2015 | ........... | C04B 24/122 |
| EP | 3106448 A1 | 12/2016 | | |
| EP | 3375831 A1 | 9/2018 | | |
| JP | 5072172 B2 | 11/2012 | | |
| NZ | 571874 A | 11/2010 | | |
| WO | 9932750 A1 | 7/1999 | | |
| WO | WO-2011113533 A1 * | 9/2011 | ............. | C04B 26/14 |
| WO | 2020126301 A1 | 6/2020 | | |

OTHER PUBLICATIONS

Machine translation of DE 102015109125 (2016, pages).*
Machine translation of EP 2826797 (2015, pages).*
Dan AI et al., Preparation of waterborne epoxy dispersion and its application in 2K waterborne epoxy coatings, Nov. 2019, vol. 136.
Saheli Bera et al., Water-based & eco-friendly epoxy-silane hybrid coating for enhanced corrosion protection & adhesion on galvanized steel, Dec. 2016, pp. 24-44, vol. 101.
Lorenzo Neil Petway, Waterborne Binder for Primer Systems, Feb. 2010, PCI Magazine.
M. Watkins et al., Formulating High-Performance Waterborne Epoxy Coatings, Sep. 2006, Thermoset Resin Formulators Association meeting in Montreal (Canada).
Lu Guangqi et al., Synthesis and Characterization of Waterborne Epoxy Curing Agent Modified by Silane, Chinese Journal of Chemical Engineering, Dec. 2007, pp. 899-905, vol. 15 - Need Copy of NPL.
George Wypych, 5—Typical Primer Formulations and Applications To Different Substrates, 2018, Chapter 5 in Handbook of Adhesion Promoters, pp. 77-91—Need Copy of NPL.
J.A. Graystone, 9—Coatings for buildings, 1999, Chapter 9 in Paint and Surface Coatings (Second edition) Theory and Practice Woodhead Publishing Series in Metals and Surface Engineering, pp. 330-410—Need Copy of NPL.
CoatOSil MP 200 Silane, 2020, Momentive website, first accessed on Jan. 17, 2020, last accessed on 2023.
Heloxy Modifier 67: 1,4 butanediol diglycidyl ether, 2020, Miller-Stephenson website, first accessed on Jan. 17, 2020, last accessed on 2023.
Epi-Rez Waterborne resin, 2020, Miller-Stephenson website, first accessed on Jan. 17, 2020, last accessed on 2023.

(Continued)

*Primary Examiner* — Brieann R Johnston
(74) *Attorney, Agent, or Firm* — Lorenz & Kopf, LLP

(57) ABSTRACT

Sealers, construction products, and methods of sealing construction products are provided. In an exemplary embodiment, a sealer includes a first part and a second part, the first part includes an epoxy resin having an epoxy resin molecular weight of about 5,000 Daltons or greater, and also includes an epoxy functional diluent having a diluent molecular weight of about 2,000 Daltons or less. The second part includes a crosslinking agent that is a polyamine. The sealer further includes a particulate with a specific gravity of from about 1 to about 5 grams per cubic centimeter.

8 Claims, 4 Drawing Sheets

(56) References Cited

OTHER PUBLICATIONS

Epi-Rez Resin 6006-W-68, 2020, Hexion website, first accessed on Jan. 17, 2020, last accessed on 2023.
Epikure Curing Agent 6870-W-53, 2020, Hexion website, first accessed on Jan. 17, 2020, last accessed on 2023.

* cited by examiner

SEALERS, METHODS OF PRODUCING SEALERS, AND METHODS OF SEALING CONSTRUCTION PRODUCTS

CROSS-REFERENCE TO RELATED APPLICATIONS

This application claims the benefit of U.S. Provisional Application No. 62/981,156, filed Feb. 25, 2020, which is hereby incorporated in its entirety by reference.

TECHNICAL FIELD

The present disclosure generally relates to sealers and methods of producing the same, and methods of sealing construction products, and more particularly relates to sealers for fiber cement board and methods of producing the same, and methods of sealing fiber cement boards.

BACKGROUND

The internal structures of houses and other buildings are commonly protected from environmental elements by exterior siding materials. These siding materials are typically planks or panels composed of wood, concrete, brick, aluminum, stucco, wood composites, or fiber cement composites. Some common fiber cement composites are fiber cement siding, roofing, and trim which are generally composed of cement, silica sand, wood fibers or other cellulosic fibers, and various additives. Fiber cement products (sometimes referred to as cement fiber boards or fiber cement boards) offer several advantages over other types of materials, such as wood siding, because they are weatherproof, relatively inexpensive to manufacture, fire-resistant, and invulnerable to rotting or insect damage.

Most commercial fiber cement products are made using the Hatsheck process. In this process, unbleached cellulose pulp fibers are re-pulped in water to provide substantially singulated fibers. The re-pulped fibers are refined and then mixed with cement, silica sand, and other optional additives or components to form a mixture. The fiber cement mixture is deposited on a felt band substrate, vacuum dewatered, layered, optionally pressed, and then cured to form a fiber reinforced cement matrix in sheet form. The form may have the appearance of standard beveled wood siding. In some embodiments, a face layer is formed over an internal layer, where the face layer has better appearance features, such as smaller fibers and/or fewer fibers. However, many other techniques are available for producing fiber cement boards.

The fiber cement boards may be milled to form an overlapping joining edge, such as a tongue and groove, shiplap, or other edge joint for fitting adjacent fiber cement boards together. The milling process may produce several different surfaces on the fiber cement board, such as a face surface, a milled surface that is smooth, and a tongue surface that remains after the milling, where the tongue surface is rougher than the milled surface. The face surface may have a different composition than the milled and tongue surfaces, because the face surface remains from the face layer.

Fiber cement boards are porous, so water or other materials may be adsorbed. A sealer may be applied to the fiber cement boards for protection, where the sealer adheres to the fiber cement board and provides a protective coating. However, sealers have different adhesive strengths on the different surfaces of a milled fiber cement board, and some of the adhesive strengths may be insufficient for good, long lasting protection.

Accordingly, it is desirable to provide a sealer for construction products, such as fiber cement boards, where the sealer has good adhesion to several different surfaces and materials of the construction product. In addition, it is desirable to provide a sealer that protects the construction product from water, is affordable, is aqueous before application, and is easy to apply. Furthermore, other desirable features and characteristics of the present embodiment will become apparent from the subsequent detailed description and the appended claims, taken in conjunction with the accompanying drawing and this background.

BRIEF SUMMARY

Sealers, methods of producing sealers, and methods of sealing construction products are provided. In an exemplary embodiment, a sealer includes a first part and a second part, the first part includes an epoxy resin having an epoxy resin molecular weight of about 5,000 Daltons or greater, and also includes an epoxy functional diluent having a diluent molecular weight of about 2,000 Daltons or less. The second part includes a crosslinking agent that is a polyamine. The sealer further includes a particulate with a specific gravity of from about 1 to about 5 grams per cubic centimeter.

A method of producing a sealer is provided in another embodiment. The method includes preparing a first part with an epoxy resin, an epoxy functional diluent, and water, where the epoxy resin has an epoxy resin molecular weight of about 5,000 Daltons or greater and the epoxy functional diluent has a diluent molecular weight of about 2,000 Daltons or less. A second part is prepared, where the second part includes a crosslinking agent and water. A particulate is added to at least one part of the sealer, where the sealer includes a plurality of parts, and where the plurality of parts includes the first part and the second part.

A method of sealing a construction product is provided in yet another embodiment. The method includes preparing a sealer by mixing a first part with a second part, where the first part includes an epoxy resin, an epoxy functional diluent, and water. The epoxy resin has an epoxy resin molecular weight of about 5,000 Daltons or more and the epoxy functional diluent has a diluent molecular weight of about 2,000 Daltons or less. The second part includes a crosslinking agent that is a polyamine. The sealer also includes a particulate. The sealer is applied to the construction product, where the construction product includes cement, wood fiber, and silica sand.

BRIEF DESCRIPTION OF THE DRAWINGS

The present embodiments will hereinafter be described in conjunction with the following drawing figures, wherein like numerals denote like elements, and wherein.

DETAILED DESCRIPTION

Figure 1:
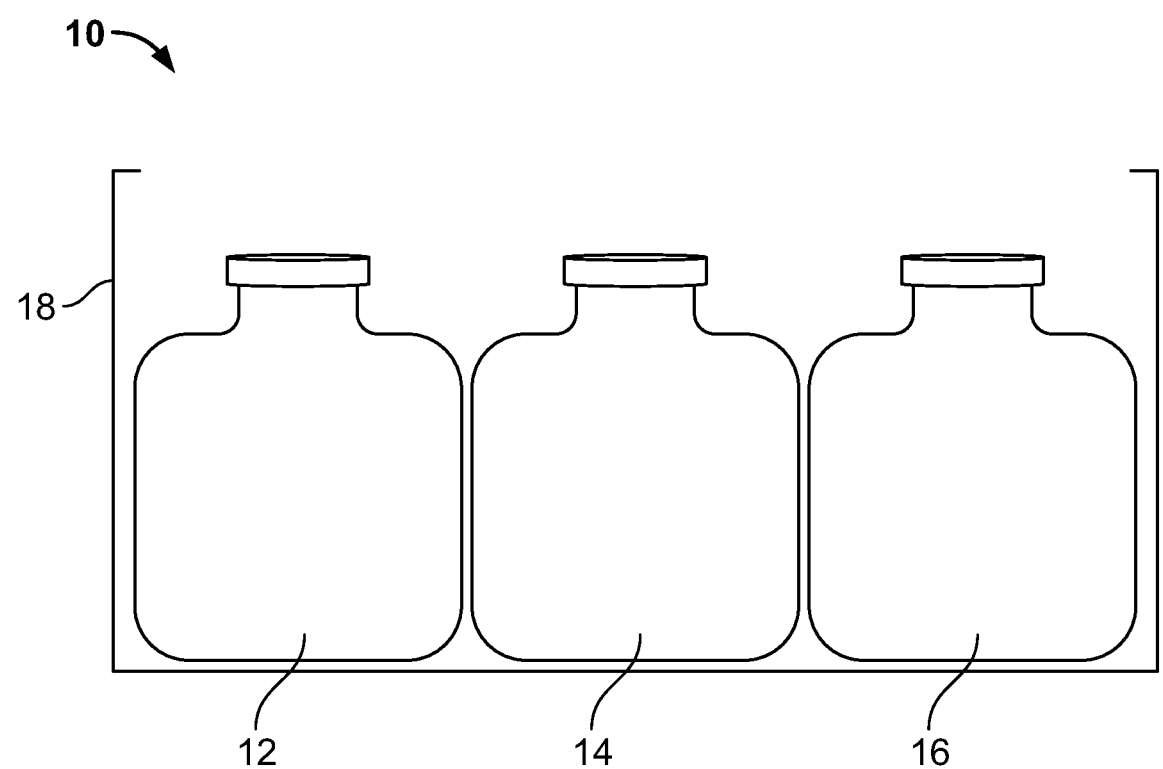
FIGS. 1 and 2 are schematic diagrams of a sealer and a method of producing the sealer in accordance with exemplary embodiments.

The following detailed description is merely exemplary in nature and is not intended to limit the application or uses of the embodiments described. Furthermore, there is no intention to be bound by any theory presented in the preceding technical field, background, brief summary, or the following detailed description.

Fiber cement board sealers have utilized epoxy resins and amine catalysts, where the addition of non-reactive components typically reduces the overall adhesion because the epoxy and amine active ingredients are diluted. However, it has unexpectedly been discovered that the addition of particulates to a sealer using epoxy resins and amine catalysts can significantly increase the adhesion strength of the sealer to fiber cement boards. In particular, pigment particulates have been demonstrated to improve the adhesion strength, where the addition of non-reactive components such as pigment particles is generally expected to reduce the adhesion of the sealer. It has also been discovered that the particulate should be present in the sealer at greater than 3 weight percent.

As used herein, a constituent that "includes" a compound includes that compound at from about 1 to about 100 weight percent, based on a total weight of the constituent, unless otherwise specified. Furthermore, a constituent that "primarily includes" a compound includes that compound at from about 50 to about 100 weight percent, based on the total weight of the constituent.

The use of numerical values in the various ranges specified in this application, unless indicated otherwise, are stated as approximations as though the minimum and maximum values within the stated ranges were both preceded by the word "about". Thus, slight variations above and below the stated ranges can be used to achieve substantially the same results as values within the ranges. Moreover, in the disclosure of these ranges, a continuous range is intended, covering every value between the minimum and maximum values, including the minimum and maximum end points of the range. In general, the term "about" means +/-10% from the stated value.

The term "solids," as used herein, refers to the non-volatile portions of the sealer composition that remain after curing, and after the solvents have evaporated. In an exemplary embodiment, the sealer composition is formulated such that the sealer composition includes from about 20 to about 85 weight percent solids, or from about 25 to about 50 weight percent solids in an alternate embodiment. The remaining portion of the sealer is solvents (where water is a solvent) or other volatile components that evaporate or dissipate on curing. A "total weight of the sealer" is the total weight of all parts of the sealer, including the weight of solvents or other materials that may later volatilize during the curing or drying process.

The term "two-pack coating composition", also known as 2K coating composition, refers to a coating composition having two packages that are stored in separate containers and sealed to increase the shelf life of the coating composition during storage. In some embodiments, more than two packages may be utilized, but the coating is still generally referred to as a 2K coating. The two packages (or more than two packages) are mixed just prior to use to form a pot mix, which has a limited pot life, typically ranging from a few minutes (up to about 45 minutes) to a few hours (up to about 8 hours), but other pot life time periods are also possible. The pot mix is then applied as a layer of a desired thickness on a substrate surface, such as a construction product. After application, the layer dries and cures at ambient or at elevated temperatures to form a coating on the substrate surface. The coating generally has desired properties, such as water resistance, good adhesion, strength, mar-resistance, and resistance to environmental damage.

Reference is made to FIG. 1. A sealer 10 includes a first part 12 and a second part 14. The sealer 10 may also include a third part 16, and may include additional parts in alternate embodiments, where the different parts 12, 14, 16 of the sealer 10 may be separately packaged and then placed in a container 18 that includes some or all of the different plurality of parts 12, 14, 16. Each part has different components, and each serves a purpose.

Figure 2:
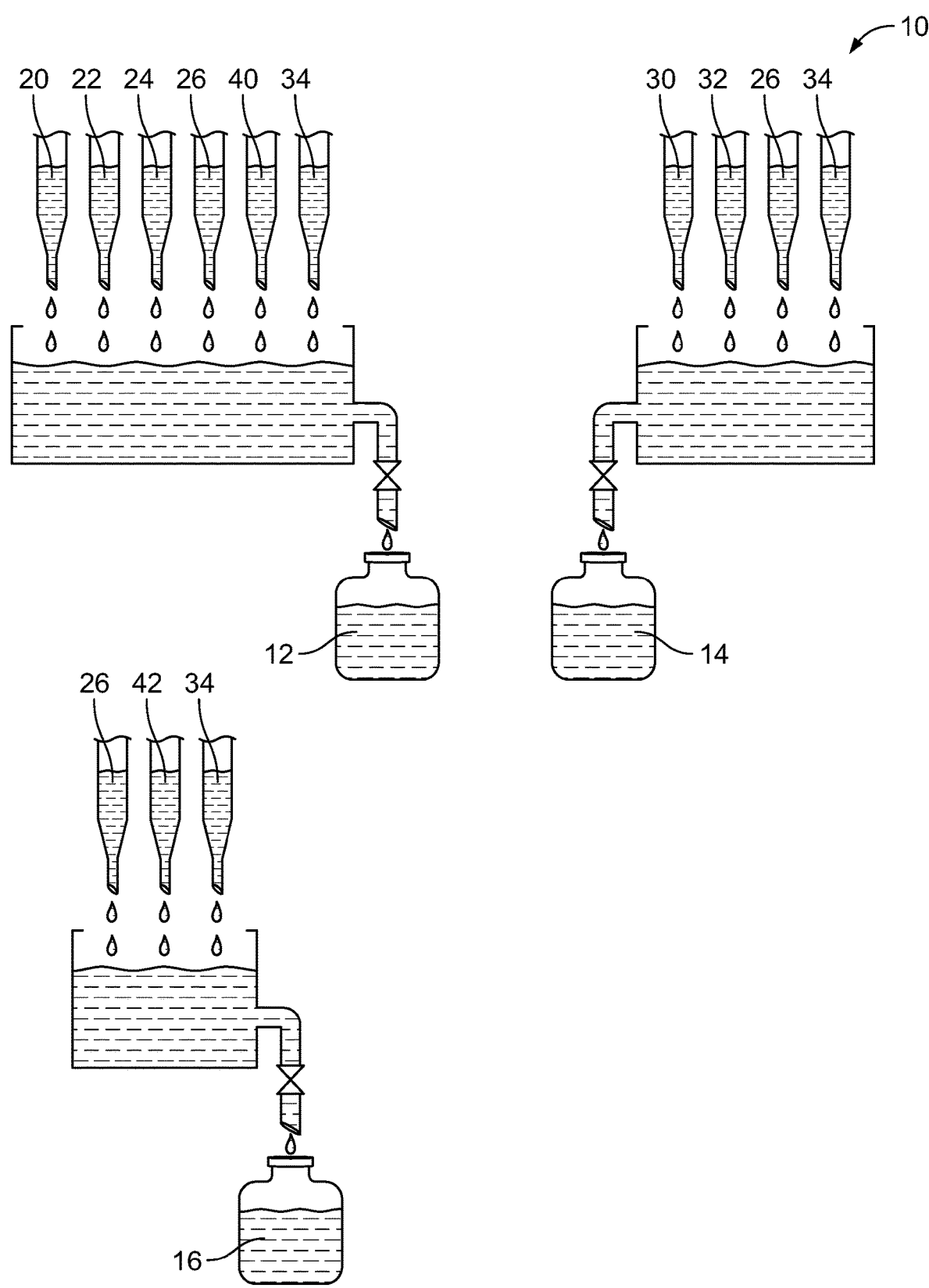

Referring to FIG. 2 with continued reference to FIG. 1, the first part 12 includes an epoxy resin 20, where the epoxy resin 20 has an epoxy resin molecular weight of about 5,000 Daltons or more in an exemplary embodiment. The molecular weights of polymers, as described herein, are number average molecular weights. However, in alternate embodiments, the epoxy resin 20 has an epoxy resin molecular weight of about 10,000 Daltons or more, or about 20,0000 Daltons or more. In some embodiments, the epoxy resin molecular weight is from about 5,000 Daltons to about 10 million Daltons. The epoxy resin 20 may be a glycidylated novolac resin in some embodiments, but in alternate embodiments different types of epoxy resin 20 may be utilized, and more than one type of epoxy resin 20 may be included in the first part 12 in some embodiments. In some embodiments, the epoxy resin 20 includes materials having an epoxy equivalent weight (EEW) of at most 1500. In an exemplary embodiment, the first part 12 includes the epoxy resin 20 in an amount of from about 5 to about 40 weight percent, based on a total weight of the first part 12. The sealer 10 may include the epoxy resin 20 in an amount of from about 5 to about 30 weight percent, or from about 5 to about 20 weight percent in an alternate embodiment, based on a total weight of the sealer 10. When the first and second parts 12, 14 are combined, the epoxy resin 20 begins reacting. As such, the epoxy resin 20 is present in the combined first and second parts 12, 14 when first combined, but the epoxy resin 20 reacts and becomes present in the sealer 10 as a component of the final product as the curing process proceeds. In this description, the individual components of the final reaction products of the sealer 10 are described, with the understanding that at least some of the individual components do react and polymerize during the cure to form a different chemical structure of which the individual components are a mere part.

In general, the epoxy resin 20 includes an epoxy moiety, and may include two or more epoxy moieties. The epoxy moieties are covalently bonded to an organic moiety of the epoxy resin 20, and a wide variety of organic moieties may be utilized. Epoxy resins 20 used in the sealer, as contemplated herein, may be prepared by a variety of processes including, for example, the condensation of a multi-hydroxy compound with epichlorohydrin. For example, the novolac resin may be the organic moiety, but other organic moieties may also be utilized, including dihydroxy compounds such as diphenols and dihydric alcohols. Besides the glycidylated novolac resin, other potential exemplary epoxy resins 20 include, but are not limited to, materials derived from the condensation of Bisphenol A and/or Bisphenol F with epichlorohydrin to produce the epoxy resin 20. Exemplary epoxy resins 20 include, but are not limited to, one or more of: the glycidylated novolac resins mentioned above; glycidyl end-capped poly(Bisphenol A-co-epichlorohydrin); glycidyl end-capped poly(Bisphenol F-co-epichlorohydrin); glycidyl end-capped poly(Bisphenol F-co-epichlorohydrin)-co-(Bisphenol A-co-epichlorohydrin); a poly(alkylene glycol) diglycidyl ether such as poly(ethylene glycol) diglycidyl ether or poly(propylene glycol) diglycidyl ether; poly (tetrahydrofuran) diglycidyl ether; other materials with one, two, or more epoxy moieties; and combinations thereof.

The first part 12 may also optionally include an epoxy functional diluent 22 having a diluent molecular weight of about 2,000 Daltons or less. However, in alternate embodiments, the diluent molecular weight is about 1,500 Daltons or less, or about 1,000 Daltons or less. In an exemplary embodiment, the diluent molecular weight is from about 50 Daltons to about 2,000 Daltons. The epoxy functional diluent 22 includes an epoxy moiety, and may include a plurality of epoxy moieties per molecule of the epoxy functional diluent 22 in an exemplary embodiment. The epoxy moiety or moieties are covalently bound to an organic base moiety. The epoxy functional diluent 22 may decrease the viscosity of the first part 12, and of the sealer 10 when the first and second parts 12, 14 are mixed. The epoxy resin 20 may have a relatively high viscosity, so the combination of the epoxy resin 20 and the epoxy functional diluent 22 may provide the advantages of the strength, reactivity, and adhesivity of the epoxy resin 20 combined with a workable viscosity. The epoxy functional diluent 22 also reacts during the cure, and therefore changes structure, as described above.

An exemplary epoxy functional diluent 22 is 1,4 butanediol diglycidyl ether, but the epoxy functional diluent 22 may include many other compounds, either alone or in combination, in alternate embodiments. Some potential epoxy functional diluents 22 include, but are not limited to: 1,4 butanediol diglycidyl ether, as mentioned above; cresyl glycidyl ether; aliphatic glycidyl ethers such as 2-ethylhexyl glycidyl ether, neopentyl glycol diglycidyl ether; glycidyl ether of cyclohexane dimethanol; an aromatic mono-functional diluent of p-tertiary butyl phenol; and trimethylol propane triglycidyl ether. The epoxy functional diluent 22 may be present in the first part 12 in an amount of from about 10 to about 50 weight percent, based on the total weight of the first part 12, and the epoxy functional diluent 22 may be present in the sealer 10 in an amount of from about 2 to about 45 weight percent, based on the total weight of the sealer 10.

The first part 12 may also optionally include an epoxy silane oligomer 24. The epoxy silane oligomer 24, if present, may improve adhesion, cure rate control, crosslinking, rheology, dispersion of particulates, and low temperature performance, and may also reduce methanol emissions during the cure process. The epoxy silane oligomer 24 includes an epoxy moiety and a silane moiety, as the name suggests. The epoxy silane oligomer 24 may have a polyfunctional structure with gamma-glycidoxy groups, but other types of epoxy silane oligomers 24 may be utilized in alternate embodiments. The epoxy silane oligomer 24 may be present in the first part 12 in an amount of from about 2 to about 10 weight percent, based on a total weight of the first part 12. The epoxy silane oligomer 24 may be present in the sealer 10 in an amount of from about 0.5 to about 5 weight percent, based on the total weight of the sealer 10. The epoxy silane oligomer 24 also reacts during the cure, and therefore changes structure, as described above.

The first part 12 also includes water 26, such that the first part 12 is aqueous. Water 26 serves as a solvent for the first part 12, and for the sealer 10 as a whole. In general, the primary solvent in the sealer 10 is water 26, where organic solvents may be present in an amount of about 5 weight percent or less or about 1 weight percent or less, based on the total weight of the sealer 10. The water 26 may be present in the first part 12 and the second part 14, where the water 26 may be present in the first part 12 in an amount of from about 30 to about 90 weight percent, based on the total weight of the first part 12. Water 26 may be present in the sealer 10 in an amount of from about 15 to about 75 weight percent, based on the total weight of the sealer 10. Water 26 does not react on cure, but does evaporate so the concentration of water 26 decreases as the sealer 10 cures.

The second part 14 includes a crosslinking agent 30, where the crosslinking agent 30 may be an amine, such as a polyamine, but other types of crosslinking agents 30 may be utilized in alternate embodiments. In various embodiments, the crosslinking agent 30 may include one or more of a modified polyamine adduct; a polyamine; a phenalkamine; melamines; ketimines; dibutyl tin dilaurate and dibutyl tin diacetate; zinc salts; zirconium acetylacetonate; acids, blocked acids, or acid anhydrides; alcohols; mercaptans; and other compounds used for crosslinking epoxy components. In an exemplary embodiment, the crosslinking agent 30 is a polyamine, and may be a modified polyamine adduct. A modified polyamine adduct is a polyamine that has reacted with a compound having epoxy functional moieties, where the epoxy functional moieties are present as a limiting reagent, and amine moieties are present in an excess. Therefore, after the polyamine and the compound with the epoxy functional moieties has reacted, there are still free amine moieties present. However, essentially all of the epoxy moieties have reacted. The use of a modified polyamine adduct can provide several benefits, including but not limited to: extending pot life; improved compatibility with different types of epoxy resins; reduced reactivity to carbon dioxide in the air; reduced toxicity and irritation to skin; and increased loading amounts that can simplify measurements when combining the first and second parts 12, 14. The crosslinking agent 30 may be present in the second part 14 in an amount of from about 20 to about 70 weight percent, based on a total weight of the second part 14. The crosslinking agent 30 may be present in the sealer 10 in an amount of from about 5 to about 55 weight percent, based on the total weight of the sealer 10. The crosslinking agent 30 reacts during the cure, and therefore changes structure, as described above.

The second part 14 also includes water 26, as described above, where the water 26 may be present in the second part 14 in an amount of from about 10 to about 60 weight percent, based on the total weight of the second part 14.

The second part 14 may optionally include an acid 32 to control pH. The acid 32 may be acetic acid in an exemplary embodiment, but the acid 32 may be one or more of many different acids in alternate embodiments. For example, the acid 32 may be one or more of: acetic acid, as mentioned above; formic acid; citric acid; hydrochloric acid; sulphuric acid; nitric acid; and many more. The acid 32 may be present in the second part 14 in an amount of from about 0 to about 50 weight percent, based on the total weight of the second part 14. The acid may be present in the sealer 10 in an amount of from about 0 to about 20 weight percent, or in an amount of from about 0.5 to about 20 weight percent, based on the total weight of the sealer 10. The acid 32 may or may not react during the cure, and the acid 32 may evaporate to some extent, as discussed above.

A wide variety of additives 34 may optionally be included in the first and/or second parts 12, 14 in various embodiments. The additives 34 may also optionally be included in the third part 16 or any other parts that may be included in the sealer 10. For example, the additive(s) 34 may optionally include one or more of rheology control components, surfactants, dyes, organic solvents, perfumes, and many other components in various embodiments.

The sealer 10 includes a particulate 40, where the particulate 40 may be present in the first part 12 and/or the second part 14, and the particulate 40 may optionally be supplied in a third part 16 or separately. In the illustrated exemplary embodiment, the particulate 40 is present in the first part 12. It has been found that the addition of a particulate 40 significantly decreases adhesion failures based on wet testing of the fiber cement boards coated with the sealer 10, and the particulate 40 also increases the pot life. The particulate 40 may be present in the sealer 10 in an amount of greater than 3 weight percent, based on the total weight of the sealer 10. Not to be bound by theory, but it is hypothesized that the particulate 40 acts as a spacer, so the epoxy-amine polymer forms a matrix with particulates 40 dispersed throughout. The particulate 40 may not react, so the particulate 40 may be present in the cured sealer in its original chemical form, but the particulate 40 does not evaporate so it does remain in the sealer 10 after the cure. Pigments may be utilized as the particulate 40, and several different pigments have been demonstrated to provide the improved adhesion and increased pot life noted herein. However, it is theorized that other particulates 40 may also be utilized. In an exemplary embodiment, the particulate 40 may be present in the sealer 10 in an amount of from about 4 to about 30 weight percent, based on the total weight of the sealer 10. In alternate embodiments, the particulate 40 may be present in the sealer 10 in an amount of from about 5 to about 20 weight percent, or from about 7 to about 10 weight percent, based on the total weight of the sealer 10.

The particulates 40 should stay suspended in the sealer 10 for a period of time that allows for application of the sealer 10, so it is desirable for the particulates 40 to have a specific gravity that results in a suspension for a time period equal to or greater than the pot life of the sealer 10. In an exemplary embodiment, the specific gravity of the particulates 40 is from about 1 to about 5 grams per cubic centimeter, or from about 2 to about 4 grams per cubic centimeter in another embodiment. The particle size of the particulates 40 may also influence the increase in adhesion of the sealer 10. As such, the particulates 40 may have a median particle size of from about 0.1 to about 100 microns, but in alternate embodiments the median particle size of the particulates 40 may be from about 0.5 to about 50 microns, or from about 1 to about 10 microns. The oil absorption may also influence the effectiveness of the particulates 40. As such, the particulates 40 may have an oil absorption value of from about 5 to about 60 grams of oil per 100 grams of particulates 40, where the oil absorption value is measured using linseed oil and tested using the ASTM D281 standard. In alternate embodiments, the oil absorption value of the particulates may be from about 10 to about 50, or from about 20 to about 40 grams of oil per 100 grams of particulates.

Several different particulates 40 have been tested and have demonstrated improved adhesion. This includes talc, wollastonite, barium sulfate, and aluminum silicate. Accordingly, particulates 40 that may be effective include, but are not limited to, acrylic latex, wollastonite, barium sulfate, aluminum silicate, potassium silicate, sodium silicate, urea beads, bentonite, phyllosilicate, clay, talc, and combinations thereof. In some embodiments, the particulate 40 is inorganic, but organic particulates 40 or a combination of organic and inorganic particulates 40 may be utilized in alternate embodiments. Sealer 10 embodiments that include a pigment particulate 40 at concentrations of about 3 weight percent or less did not show significant increases in adhesion, so the particulate 40 should be present in the sealer 10 at a concentration of greater than 3 weight percent.

In some embodiments, a third part 16 may be used. In an exemplary embodiment, the third part 16 includes water 26 and a pigmented tint 42, where the pigmented tint 42 is a particulate 40 in water solutions. The water 26 may be used to bring the sealer 10 to a desired percent solids, and the pigmented tint 42 may be used for coloring. The pigmented tint 42 does increase the total quantity of particulates 40 in the sealer 10, but the concentration of the pigmented tint 42 may be low enough that it does not produce a significant change in the adhesion or performance of the sealer 10.

Figure 3:
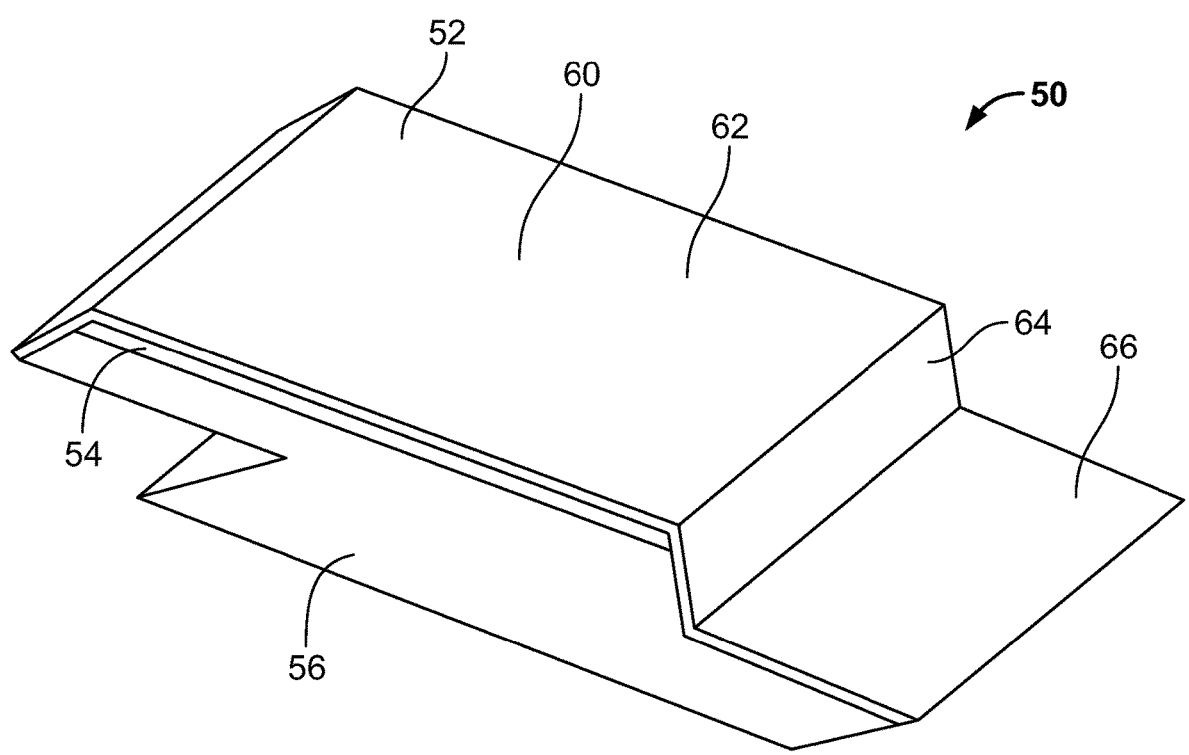
FIG. 3 is a perspective view of a construction product in accordance with an exemplary embodiment.

Reference is made to FIG. 3, with continuing reference to FIGS. 1 and 2. A construction product 50 may be coated with the sealer 10, where curing of the sealer 10 on the construction product 50 forms a sealing film 52 overlying the construction product 50. In an exemplary embodiment, the construction product 50 is a fiber cement board that includes cement, wood fibers, silica sand, and may optionally include additional components. In an exemplary embodiment, the fiber cement board includes cement in an amount of from about 40 to about 60 weight percent, wood fibers in an amount of from about 8 to 20 weight percent, silica sand in an amount of from about 10 to about 30 weight percent, and may include other fillers in an amount of from about 10 to 30 weight percent, where the weight percent's are based on a total weight of the fiber cement board. However, other concentration ranges are possible in alternate embodiments. The construction product 50 may have a face 54 and an interior 56 with different compositions, where the face 54 may be more aesthetically pleasing and the interior 56 may provide more strength. In an exemplary embodiment, the face 54 has less wood fiber than the interior 56.

The construction product 50 has a surface 60, and the surface 60 may be further divided into a face surface 62, a bevel surface 64, and a tongue surface 66, as well as other surfaces. The bevel surface 64 may be burnished during manufacture, such that the bevel surface 64 is smoother than the tongue surface 66. The tongue surface 66 may have loose particulates overlying it in some embodiments, where the loose particulates present on the tongue surface 66 may have a particle size significantly greater than 100 microns such that the loose particulates do not influence the adhesion of the sealer 10. The face surface 62 is the surface of the face 54, so the face surface 62 may have a different composition from the bevel surface 64 and the tongue surface 66. Therefore, the construction product 50 has several surfaces 60, each of which may have different adhesion properties. The sealing film 52 may be applied to the face surface 62, the bevel surface 64, and the tongue surface 66, where other surfaces 60 of the construction product 50 may or may not be covered by the sealing film 52. The different surfaces and compositions of the face, bevel, and tongue surfaces 62, 64, 66 results in the sealing film 52 having different adhesion strengths for the different surfaces 60. The sealer 10 should have good adhesion for each of these different surfaces 60.

The sealer 10 is prepared by mixing the first part 12, the second part 14, the optional third part 16 if present, and any other optional parts that may be present, and the mixture is then applied to the construction product 50, and particularly at least to the face surface 62, the bevel surface 64, and the tongue surface 66. The sealer 10 is then cured to form the sealing film 52, where the epoxy moieties react with the crosslinker during the curing process. During the curing process, the sealer 10 adheres to the surfaces 60, including the face, bevel, and tongue surfaces 62, 64, 66, such that the sealing film 52 is adhered to the construction product 50. The sealer 10 may be applied to the construction product 50 by brushing, spraying, dipping, wiping, or by any other technique that deposits a thin layer of the sealer 10 onto the construction product 50. The sealer 10 may be cured at various temperatures and for various times. An exemplary curing technique is presented below in the EXPERIMENTAL section.

EXPERIMENTAL

Figure 4:
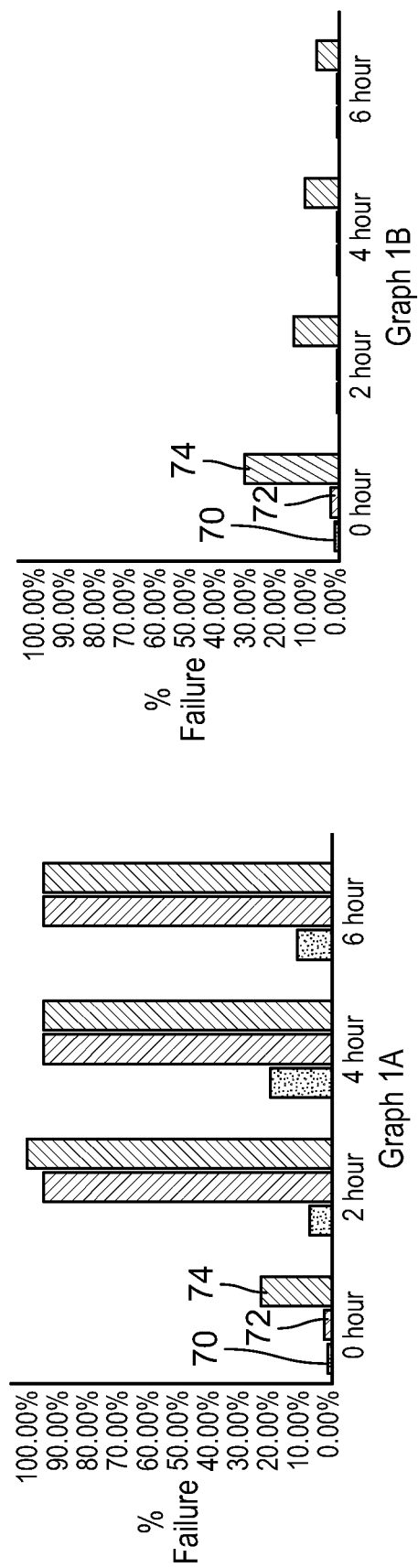
FIG. 4 includes tables illustrating adhesion performance of a sealer on the construction product with and without a particulate.

The wet adhesion of the sealer 10 was tested with and without particulates 40, where the particulates 40 tested and illustrated in FIG. 4 were talc. The experimental tests without particulates 40 did include the pigmented tint 42, so there was a low concentration of particulates 40 present. The sealer 10, after mixing the first, second, and third parts 12, 14, 16, was painted onto fiber cement boards to produce a dry film thickness of 0.5 mils. The fiber cement boards were allowed to flash dry for about 30 seconds, and then placed in a forced air oven at about 204° C., where the boards remain until reaching a desired surface temperature of from 85° C. to 121° C., depending on the experiment. After reaching the desired surface temperature, the boards are removed from the oven and allowed to cool at room temperature, or from about 18 to about 24° C.

FIG. 4 illustrates the differences in the adhesion for the sealer 10 with and without the talc. Graph 1A illustrates the wet adhesion of a comparable sealer 10 without any particulates 40 (other than the low concentration of pigmented tint 42), and Graph 1B represents the wet adhesion of a sealer 10 as described herein with additional particulates 40 in the form of the talc. Adhesion of the sealer 10 to the face surface 62 is the first bar at each time period, and is indicated by the reference number 70. Adhesion of the sealer 10 to the bevel surface 64 is the second bar at each time period, and is indicated by the reference number 72, and adhesion of the sealer 10 to the tongue surface 66 is the third bar at each time period and is represented by the reference number 74. The wet adhesion test utilized and reported herein is conducted as follows: (1) fiber cement boards are sealed with the sealer 10 and the coated with a topcoat, and the sealer 10 and topcoat are cured. The topcoat used was Sherwin Williams® A100 in some cases and Axalta's® Color+High Hide White in other cases. (2) The fiber cement boards are then placed in tap water for the specified amount of time, as indicated in FIG. 4. (3) The fiber cement boards are removed from the water, wiped dry with a paper towel, and allowed to air dry for about 5 minutes. (4) Tape is paced on each different surface being tested, and pressed to the fiber cement board with a brush (5 strokes forward and 5 strokes back) and the further pressed with a ten pound (4.5 kilogram) roller with 10 strokes forward and ten strokes backward. The tape used was Scotch® brand masking tape. (5) The tape was then rapidly removed. Adhesion failure is defined as the percentage of visible damage to the surface being tested, where failure may be removal of the topcoat or both the topcoat and the sealer 10. The table below lists the raw materials used in the sealer 10 with and without the talc that was tested, where the test results are in FIG. 4. As can be seen, the talc particulates significantly improved the adhesion of the sealing film 52 to all of the tested surfaces 60.

TABLE 1

|  |  | Trade name | Sealer with no talc | Sealer with talc |
|---|---|---|---|---|
| Part 1 | 1,4 butanediol diglycidyl ether | Heloxy ™ 67 | 9.8 | 8.7 |
|  | Glycidylated novolac resin | EPI-REZ ™ 6006-W-68 | 1.7 | 1.5 |
|  | Epoxy silane oligomer | Coatosil ™ MP 200 | 0.6 | 0.5 |
|  | Talc | Taicron ® MP 15-38 |  | 11.3 |
|  | water |  | 20.66 | 18.33 |
| Part 2 | Non-ionic aqueous dispersion of modified polyamine adduct | Epikure ™ 6870-W-53 | 22.0 | 19.5 |
|  | Acetic acid[1] |  | 0.9 | 0.8 |
|  | water |  | 20.66 | 18.33 |
| Part 3 | Water |  | 20.68 | 18.44 |
|  | Green pigmented tint |  | 3 | 2.6 |

[1]Acetic acid was a 25% solution in water.
All concentrations are in weight percent, based on the total weight of the sealer.

As can be seen, adhesion was significantly better with talc than without. The addition of a non-reactive component, such as the particulate talc, was expected to lower the adhesion because less of the reactive components were present. However, the opposite was observed and measured. The relatively low concentration of pigmented tint 42 (about 3 weight percent maximum) did not provide a significant increase in adhesion for the sealer 10. As such, the concentration of particulates 40 should be present in the sealer 10 an amount at least greater than 3 weight percent. It is also possible that the particle size, oil absorption, or other properties of the pigmented tint 42 were such that the pigmented tint 42 did not provide the increased adhesion observed with the talc and other pigments tested.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the application in any way. Rather, the foregoing detailed description will provide those skilled in the art with a convenient road map for implementing one or more embodiments, it being understood that various changes may be made in the function and arrangement of elements described in an exemplary embodiment without departing from the scope, as set forth in the appended claims.

What is claimed is:

1. A sealer comprising:
a first part, wherein the first part comprises an epoxy resin having an epoxy resin molecular weight of about 5,000 Daltons or greater, an epoxy functional diluent having a diluent molecular weight of about 2,000 Daltons or less, an epoxy silane oligomer, and water, wherein the epoxy resin is a glycidylated novolac resin, and the epoxy functional diluent is 1,4 butanediol diglycidyl ether;
a second part, wherein, the second part comprises a crosslinking agent, and wherein the crosslinking agent is a modified polyamine adduct, and wherein the second part further comprises an acid;
a particulate having a specific gravity of from about 1 to about 5 grams per cubic centimeter, wherein the particulate is talc; and
wherein the glycidylated novolac resin is present in the sealer in an amount of from about 5 to about 30 weight percent, the 1,4 butanediol diglycidyl ether is present in the sealer in an amount of from about 2 to about 45 weight percent, the particulate is present in the sealer in an amount of from about 4 to about 30 weight percent, the epoxy silane oligomer is present in the sealer in an amount of from about 0.5 to about 5 weight percent, the modified polyamine adduct is present in the sealer in an amount of from about 5 to about 55 weight percent, and the water is present in the sealer in an amount of from about 15 to about 75 weight percent, all based on a total weight of the sealer, where the total weight of the sealer is the sum of a total weight of each part of the sealer.

2. The sealer of claim 1, wherein the particulate has a median particle size of from about 1 to about 10 microns.

3. The sealer of claim 1, wherein the acid is acetic acid, and wherein the sealer comprises the acetic acid in an amount of from about 0.5 to about 20 weight percent, based on the total weight of the sealer.

4. A method of producing a sealer, the method comprising the steps of:
preparing a first part, wherein the first part comprises an epoxy resin having an epoxy resin molecular weight of about 5,000 Daltons or greater, an epoxy functional diluent having a diluent molecular weight of about 2,000 Daltons or less, an epoxy silane oligomer, and water wherein the epoxy resin is a glycidylated novolac resin, and the epoxy functional diluent is 1,4 butanediol digylcidyl ether, wherein the glycidylated novolac resin is present in the first part in an amount of from about 5 to about 40 weight percent, the 1,4 butanediol digylcidyl ether is present in the first part in an amount of from about 10 to about 50 weight percent, the epoxy silane oligomer is present in the first part in an amount of from about 2 to about 10 weight percent, and the water is present in the first part in an amount of from about 30 to about 90 weight percent, all based on a total weight of the first part;
preparing a second part, wherein the second part comprises a crosslinking agent, acetic acid and water, wherein the crosslinking agent is a modified polyamine adduct, and wherein the modified polyamine adduct is present in the second part in an amount of from about 20 to about 70 weight percent, the acetic acid is present in the second part in an amount of from more than 0 to about 50 weight percent, and the water is present in the second part in an amount of from about 10 to about 60 weight percent, all based on a total weight of the second part; and
adding a particulate to at least one part of the sealer, wherein the sealer comprises a plurality of parts, and wherein the plurality of parts comprises the first part and the second part and wherein the particulate is present in the sealer in an amount of from about 4 to about 30 weight percent, based on a total weight of the sealer, where the total weight of the sealer is the sum of a total weight of each part of the plurality of parts of the sealer.

5. The method of claim 4, wherein adding the particulate comprises adding the particulate, wherein the particulate has a specific gravity of from about 1 to about 5 grams per cubic centimeter, and wherein the particulate has a median particle size of from about 0.5 to about 50 microns.

6. The method of claim 5, wherein adding the particulate comprises adding the particulate, wherein the particulate is selected from the group of acrylic latex, wollastonite, barium sulfate, aluminum silicate, potassium silicate, sodium silicate, urea beads, bentonite, phyllosilicate, clay, talc, and combinations thereof.

7. The method of claim 4, wherein adding the particulate comprises adding the particulate wherein the particulate is inorganic.

8. A method of sealing a construction product, the method comprising the steps of:
preparing a sealer by mixing a first part with a second part, wherein the first part comprises an epoxy resin having an epoxy resin molecular weight of about 5,000 Daltons or greater, an epoxy functional diluent having a diluent molecular weight of about 2,000 Daltons or less, an epoxy silane oligomer, and water, wherein the epoxy resin comprises a glycidylated novolac resin, the epoxy functional diluent comprises 1,4 butanediol diglycidyl ether, and wherein the second part comprises a crosslinking agent that comprises a modified polyamine adduct, and wherein the second part further comprises an acid, wherein the sealer further comprises a particulate, wherein the glycidylated novolac resin is present in the sealer in an amount of from about 5 to about 30 weight percent, the 1,4 butanediol diglycidyl ether is present in the sealer in an amount of from about 2 to about 45 weight percent, the particulate is present in the sealer in an amount of from about 4 to about 30 weight percent, the epoxy silane oligomer is present in the sealer in an amount of from about 0.5 to about 5 weight percent, the modified polyamine adduct is present in the sealer in an amount of from about 5 to about 55 weight percent, and the water is present in the sealer in an amount of from about 15 to about 75 weight percent, all based on a total weight of the sealer, where the total weight of the sealer is the sum of a total weight of each part of the sealer; and
applying the sealer to the construction product, wherein the construction product comprises cement, wood fiber, and silica sand.

* * * * *